US012811065B2

(12) United States Patent
Park et al.

(10) Patent No.: US 12,811,065 B2
(45) Date of Patent: Nov. 24, 2026

(54) MULTILAYER ELECTRONIC COMPONENT

(71) Applicant: SAMSUNG ELECTRO-MECHANICS CO., LTD., Suwon-si (KR)

(72) Inventors: Jung Jin Park, Suwon-si (KR); Yong Park, Suwon-si (KR); Kwan Soo Park, Suwon-si (KR); Ho Sam Choi, Suwon-si (KR); Rak Hyeon Baek, Suwon-si (KR); Hyo Sung Choi, Suwon-si (KR); Sun Mi Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 292 days.

(21) Appl. No.: 18/627,255

(22) Filed: Apr. 4, 2024

(65) Prior Publication Data

US 2025/0029787 A1 Jan. 23, 2025

(30) Foreign Application Priority Data

Jul. 21, 2023 (KR) ........................ 10-2023-0095529
Oct. 18, 2023 (KR) ........................ 10-2023-0139246

(51) Int. Cl.
*H01G 4/30* (2006.01)
*H01G 4/012* (2006.01)
*H01G 4/232* (2006.01)

(52) U.S. Cl.
CPC ............... *H01G 4/30* (2013.01); *H01G 4/012* (2013.01); *H01G 4/232* (2013.01)

(58) Field of Classification Search
CPC ........... H01G 4/30; H01G 4/012; H01G 4/232
See application file for complete search history.

(56) References Cited

U.S. PATENT DOCUMENTS

2019/0362897 A1* 11/2019 Kato ...................... H01G 4/232
2024/0203651 A1 6/2024 Park et al.

FOREIGN PATENT DOCUMENTS

KR 10-2023-0032725 A 3/2023
KR 20230032725 A * 3/2023 ............... H01G 4/30
KR 10-2024-0092345 A 6/2024

OTHER PUBLICATIONS

Park; Mussel-Inspired Ceramic Layer for Enhancement of Mechanical Properties (Year: 2021).*

* cited by examiner

*Primary Examiner* — Michael P McFadden
(74) *Attorney, Agent, or Firm* — Morgan, Lewis & Bockius LLP

(57) ABSTRACT

A multilayer electronic component includes a body including a capacitance formation portion including a dielectric layer and internal electrodes alternately disposed in a first direction, and a cover portion disposed on both surfaces of the capacitance formation portion opposing each other in the first direction; and an external electrode disposed on the body and connected to the internal electrode, wherein the cover portion includes polydopamine.

16 Claims, 10 Drawing Sheets

I-I'

MULTILAYER ELECTRONIC COMPONENT

CROSS-REFERENCE TO RELATED APPLICATION(S)

This application claims benefit of priority to Korean Patent Application No. 10-2023-0139246 filed on Oct. 18, 2023 and Korean Patent Application No. 10-2023-0095529 filed on Jul. 21, 2023 in the Korean Intellectual Property Office, the disclosures of which are incorporated herein by reference in their entirety.

BACKGROUND

1. Technical Field

The present disclosure relates to a multilayer electronic component.

2. Description of Related Art

A multilayer electronic component (MLCC), a multilayer electronic component, may be a chip condenser mounted on the printed circuit boards of various electronic products including as image display devices such as a liquid crystal display (LCD) and a plasma display panel (PDP), a computer, a smartphone, a mobile phone, or the like, charging or discharging electricity therein or therefrom. Such a multilayer ceramic capacitor may be used as a component of various electronic devices, as a multilayer ceramic capacitor may have a small size and high capacitance and may be easily mounted.

Recently, to ensure capacitance per unit volume of a multilayer ceramic capacitor, a multilayer ceramic capacitor has been miniaturized, and accordingly, a thickness of a cover portion to protect a capacitance formation portion for forming capacitance of the multilayer ceramic capacitor has been reduced. However, as a thickness of the cover portion decreases, mechanical strength of the multilayer ceramic capacitor may weaken, which may cause cracks or brittle fractures in the multilayer ceramic capacitor. The cracks may become a path for external moisture to enter the multilayer ceramic capacitor, causing a decrease in moisture resistance reliability of the multilayer ceramic capacitor.

Accordingly, to prevent mechanical strength and moisture resistance reliability of a multilayer ceramic capacitor from being reduced, research to improve hardness and toughness of the cover portion may be necessary.

SUMMARY

An embodiment of the present disclosure is to provide a multilayer electronic component having improved mechanical strength and moisture resistance reliability.

According to an embodiment of the present disclosure, a multilayer electronic component includes a body including a capacitance formation portion including a dielectric layer and internal electrodes alternately disposed in a first direction, and a cover portion disposed on both surfaces of the capacitance formation portion opposing each other in a first direction; and an external electrode disposed on the body and connected to the internal electrodes, wherein the cover portion includes polydopamine.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
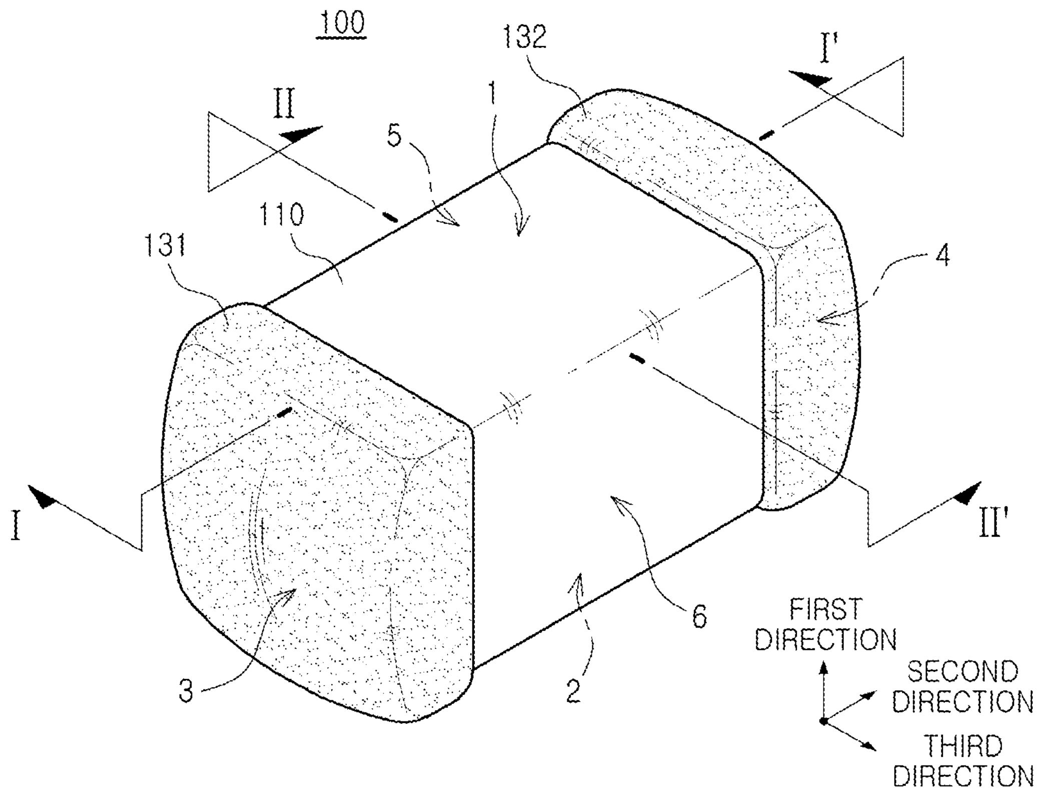
FIG. 1 is a perspective diagram illustrating a multilayer electronic component according to an embodiment of the present disclosure.

Hereinafter, embodiments of the present disclosure will be described as below with reference to the accompanying drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another embodiment without departing from the spirit and scope of the present disclosure. Further, modifications of positions or arrangements of elements in embodiments may be made without departing from the spirit and scope of the present disclosure. The following detailed description is, accordingly, not to be taken in a limiting sense, and the scope of the present invention are defined only by appended claims, appropriately interpreted, along with the full range of equivalents to which the claims are entitled.

In the drawings, same elements will be indicated by same reference numerals. Also, redundant descriptions and detailed descriptions of known functions and elements which may unnecessarily make the gist of the present disclosure obscure will be omitted. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, the first direction may be defined as a thickness (T) direction, the second direction may be defined as a length (L) direction, and the third direction may be defined as a width (W) direction.

Multilayer Electronic Component

FIG. 1 is a perspective diagram illustrating a multilayer electronic component according to an embodiment.

Figure 2:
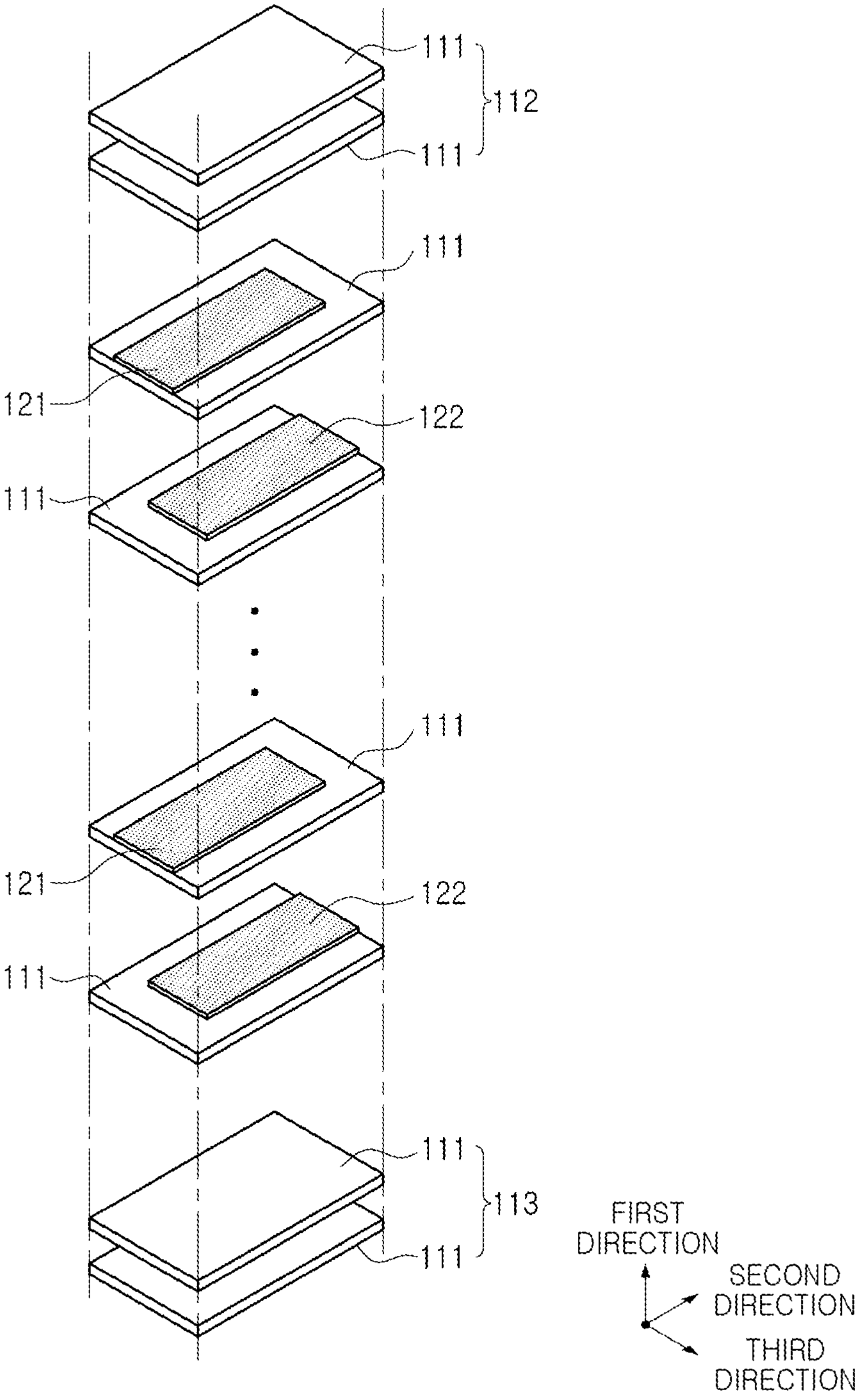
FIG. 2 is an exploded perspective diagram illustrating the body and cover portion of the embodiment illustrated in FIG. 1.

FIG. 2 is an exploded perspective diagram illustrating the body and cover portion of the embodiment illustrated in FIG. 1.

Figure 3:
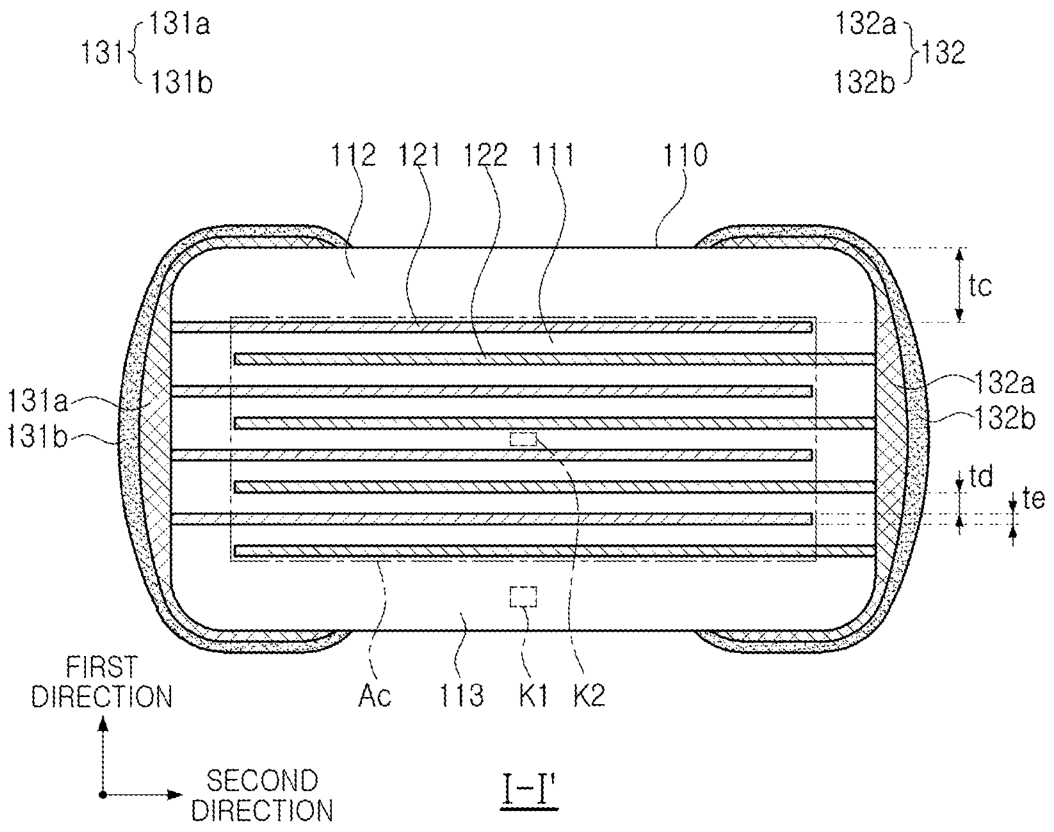
FIG. 3 is a cross-sectional diagram illustrating a cross-sectional surface, taken along line I-I' in FIG. 1.

FIG. 3 is a cross-sectional diagram illustrating a cross-sectional surface, taken along line I-I' in FIG. 1.

Figure 4:
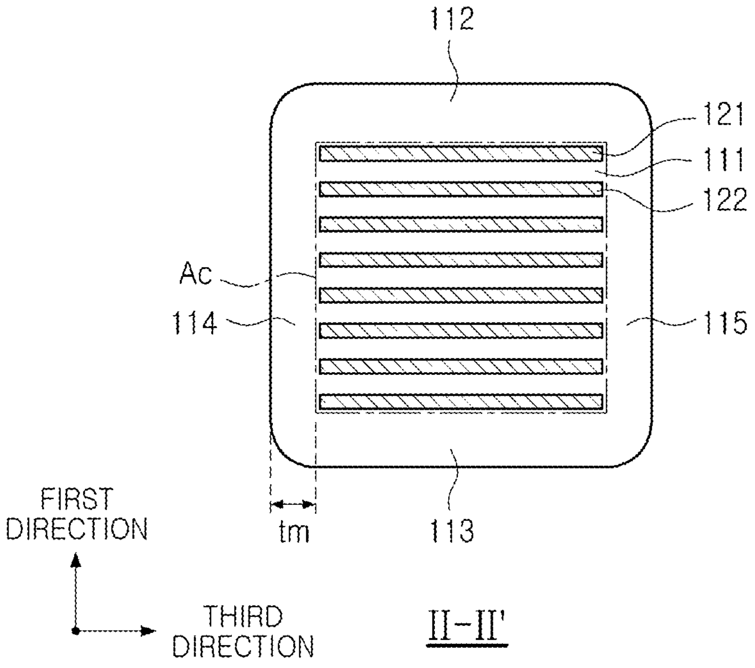
FIG. 4 is a cross-sectional diagram illustrating a cross-sectional surface, taken along line II-II' in FIG. 1.

FIG. 4 is a cross-sectional diagram illustrating a cross-sectional surface, taken along line II-II' in FIG. 1.

Figure 5A:
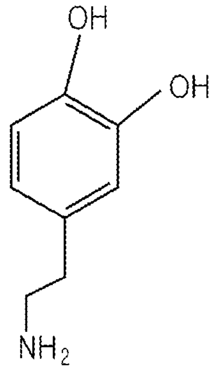
FIG. 5A is a diagram illustrating a chemical structure of dopamine hydrochloride.
Figure 5B:
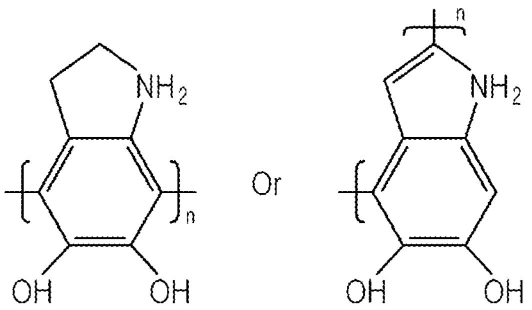
FIG. 5B is a diagram illustrating chemical structures of polydopamine polymer.
Figure 5C:
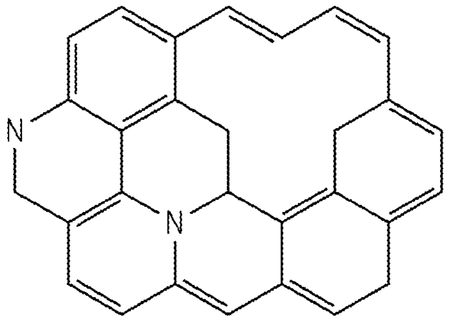
FIG. 5C is a diagram illustrating a chemical structure of nitrogen-doped carbonized polydopamine.
Figure 6:
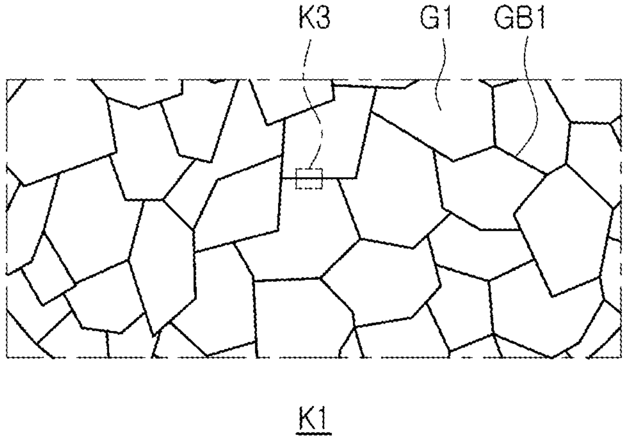
FIG. 6 is an enlarged diagram illustrating region K1 in FIG. 3.

FIG. 5A is a diagram illustrating a chemical structure of dopamine hydrochloride;

FIG. 5B is a diagram illustrating chemical structures of polydopamine polymer;

FIG. 5C is a diagram illustrating a chemical structure of nitrogen-doped carbonized polydopamine;

FIG. 6 is an enlarged diagram illustrating region K1 in FIG. 4.

Figure 7:
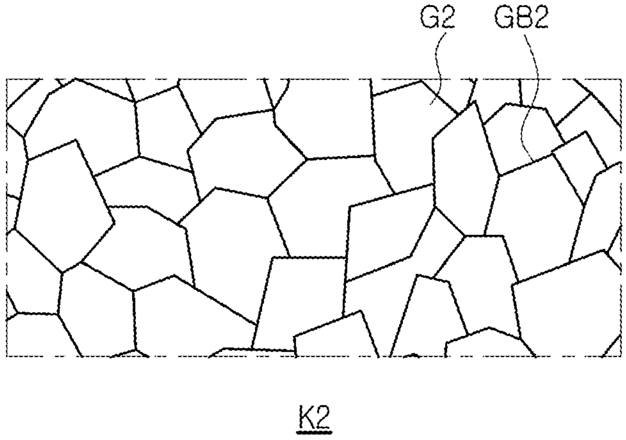
FIG. 7 is an enlarged diagram illustrating region K2 in FIG. 3.

FIG. 7 is an enlarged diagram illustrating region K2 in FIG. 4.

Figure 8:
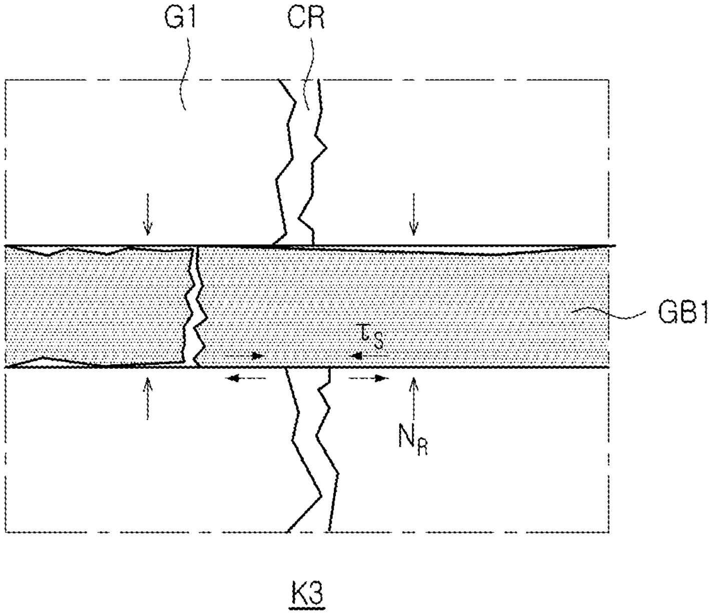
FIG. 8 is an enlarged diagram illustrating region K3 in FIG. 6, illustrating suppression of spread of cracks by a cover portion of a multilayer electronic component according to an embodiment of the present disclosure.

FIG. 8 is an enlarged diagram illustrating region K3 in FIG. 4, illustrating suppression of spread of cracks by a cover portion of a multilayer electronic component according to an embodiment.

Figure 9:
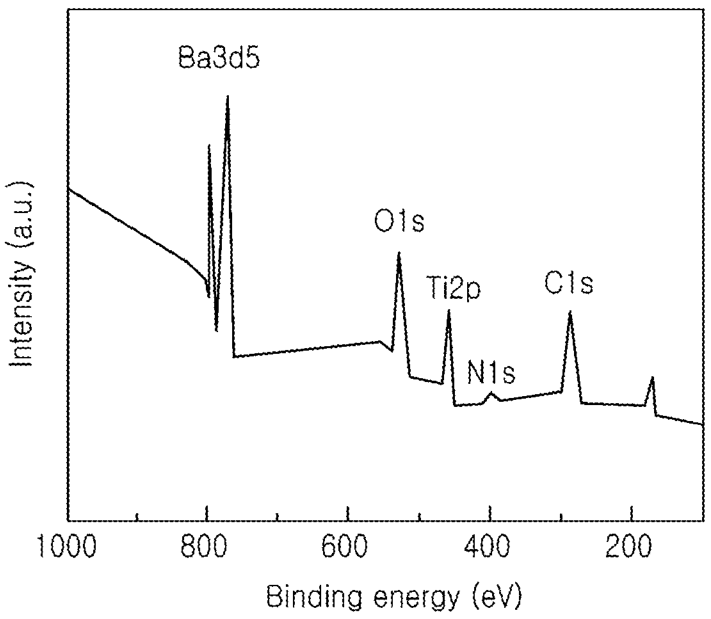
FIG. 9 is a graph indicating results of analyzing a cover portion of a multilayer electronic component using X-ray photoelectron spectroscopy (XPS) according to an embodiment.

FIG. 9 is a graph indicating results of analyzing a cover portion of a multilayer electronic component using X-ray photoelectron spectroscopy (XPS) according to an embodiment.

Figure 10:
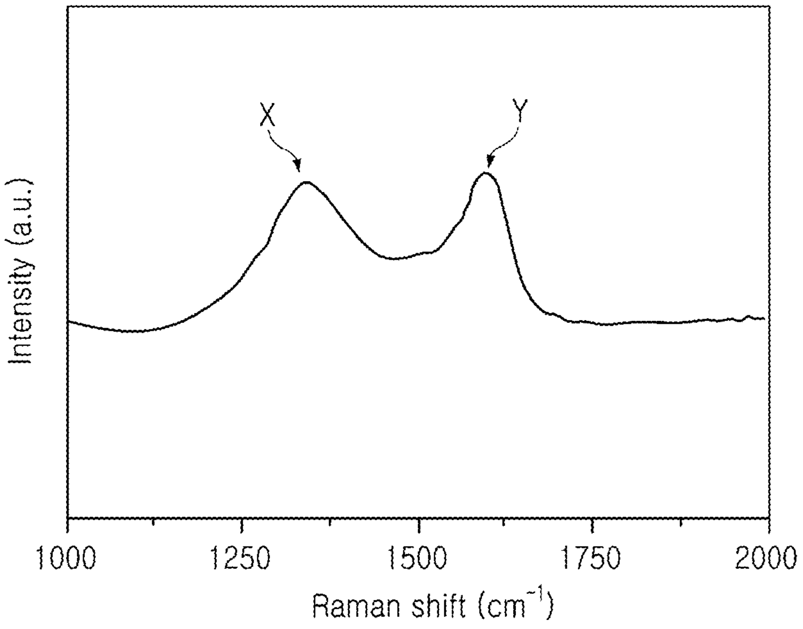
FIG. 10 is a graph indicating results of analyzing a cover portion of a multilayer electronic component using Raman analysis according to an embodiment.

FIG. 10 is a graph indicating results of analyzing a cover portion of a multilayer electronic component using Raman analysis according to an embodiment.

Hereinafter, a multilayer electronic component according to an embodiment will be described in greater detail with reference to FIGS. 1 to 10. A multilayer ceramic capacitor will be described as an example of a multilayer electronic component, but an embodiment thereof is not limited thereto, and the multilayer ceramic capacitor may be applied to various multilayer electronic components, such as an inductor, a piezoelectric element, a varistor, or a thermistor.

A multilayer electronic component 100 may include a body 110 and external electrodes 131 and 132.

The shape of the body 110 may not be limited to any particular shape, but as illustrated, the body 110 may have a hexahedral shape or a shape similar to a hexahedral shape. Due to reduction of ceramic powder included in the body 110 during a firing process or polishing of corners, the body 110 may not have an exactly hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The body 110 may include the first and second internal electrodes 121 and 122 disposed alternately in the first direction with the dielectric layer 111 and the dielectric layer 111 therebetween. The plurality of dielectric layers 111 forming the body 110 may be in a fired state, and boundaries between adjacent dielectric layers 111 may be integrated with each other such that the boundaries therebetween may not be distinct without using a scanning electron microscope (SEM).

The dielectric layer 111 may be formed by preparing a ceramic slurry including ceramic powder, an organic solvent, an additive, and a binder, preparing a ceramic green sheet by coating the slurry on a carrier film and drying the slurry, and firing the ceramic green sheet. The ceramic powder is not limited to any particular example as long as sufficient electrostatic capacitance may be obtained therewith. An example of the ceramic powder may include $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium) and Zr (zirconium) are partially dissolved.

The internal electrodes 121 and 122 may include a first internal electrode 121 and a second internal electrode 122 alternately disposed in the first direction with the dielectric layer 111 interposed therebetween. That is, the first internal electrode 121 and the second internal electrode 122, which are a pair of electrodes with different polarities, may be disposed to oppose each other with the dielectric layer 111 therebetween. The first internal electrode 121 and the second internal electrode 122 may be electrically separated from each other by the dielectric layer 111 disposed therebetween.

The first internal electrode 121 may be spaced apart from the fourth surface 4 and may be connected to the first external electrode 131 on the third surface 3 side. The second internal electrode 122 may be spaced apart from the third surface 3 and may be connected to the second external electrode 132 on the fourth surface 4 side.

A conductive metal included in the internal electrodes 121 and 122 may be one or more of Ni, Cu, Pd, Ag, Au, Pt, Sn, W, Ti and alloys thereof, and more preferably, may include Ni, but an embodiment thereof is not limited thereto.

The internal electrodes 121 and 122 may be formed by applying a conductive paste for an internal electrode including a conductive metal to a predetermined thickness on the ceramic green sheet and firing. The printing method for the conductive paste for internal electrodes may include screen printing or gravure printing, but an embodiment thereof is not limited thereto.

An average thickness td of the dielectric layer 111 and an average thickness the of the internal electrodes 121 and 122 do not need to be limited to any particular example. The average thickness td of the dielectric layer 111 may be, for example, 0.1 μm to 10 μm. The average thickness the of the internal electrodes 121 and 122 may be, for example, 0.1 μm to 3.0 μm. Also, the average thickness td of the dielectric layer 111 and the average thickness of the internal electrodes 121 and 122 may be arbitrarily determined depending on desired properties or purposes. For example, in the case of high-voltage electronic components to obtain miniaturization and high capacitance, the average thickness td of the dielectric layer 111 may be less than 2.8 μm, and the average thickness the of the internal electrodes 121 and 122 may be less than 1 μm. Also, in the case of small IT electronic components to obtain miniaturization and high capacitance, the average thickness td of the dielectric layer 111 may be 0.4 μm or less, and the average thickness the of the internal electrodes 121 and 122 may be 0.4 μm or less.

The average thickness td of the dielectric layer 111 and the average thickness the of the internal electrodes 121 and 122 may indicate sizes of the dielectric layer 111 and the internal electrodes 121 and 122 in the first direction, respectively. The average thickness td of the dielectric layer 111 and the average thickness the of the internal electrodes 121 and 122 may be measured by scanning a cross-section of the body 110 in the first and second directions using a scanning electron microscope (SEM) with a magnification of 10,000. More specifically, the average thickness td of the dielectric layer 111 may be measured from the thicknesses of the dielectric layer 111 at 30 points spaced apart by an equal distance in the second direction. Also, the average thickness the of internal electrodes 121 and 122 may be measured by measuring the thickness at multiple points of one internal electrode 121 and 122, for example, 30 points spaced apart by an equal distance in the second direction. The 30 points spaced apart by an equal distance may be designated in the capacitance formation portion Ac. By measuring the average value after performing the average value measurements on ten dielectric layers 111 and 10 internal electrodes 121 and 122, respectively, the average thickness td of the dielectric layer 111 and the average thickness the of the internal electrodes 121 and 122 may be further generalized.

The body 110 may include cover portions 112 and 113 disposed on both surfaces opposing each other of the capacitance formation portion Ac in the first direction. The body 110 may include a first cover portion 112 disposed on the first surface 1 side and a second cover portion 113 disposed on the second surface 2 side. The cover portions 112 and 113 may basically prevent damage to the internal electrode due to physical or chemical stress. The cover portions 112 and 113 may be configured similarly to the dielectric layer 111 other than the configuration in which an internal electrode is not included.

An average thickness tc of the cover portions 112 and 113 does not need to be limited to any particular example. That is, the average thickness tc of the cover portions 112 and 113 may be arbitrarily determined depending on desired properties or purposes. For example, for miniaturization and high capacitance of multilayer electronic components, an average thickness tc of the cover portions 112 and 113 may be 300 μm or less, 100 μm or less, 30 μm or less, or 20 μm or less, but an embodiment thereof is not limited. Thereto. Here, the average thickness tc of the cover portions 112 and 113 may indicate an average thickness of each of the first cover portion 112 and the second cover portion 113.

The average thickness tc of the cover portions 112 and 113 may indicate an average size of the cover portions 112 and 113 in the first direction, and may be an average value of a size in the first direction measured at five points at equal intervals in the second direction in cross-sections of the body 110 in the first and second direction.

The cover portions 112 and 113 may be formed by laminating at least one layer of a ceramic green sheet for forming a cover portion not forming an internal electrode pattern on both surfaces opposing each other in the first direction of the capacitance formation portion Ac and firing.

The body 110 may include margin portions 114 and 115 disposed on both surfaces opposing each other in the third direction of the capacitance formation portion Ac. The body 110 may include a first margin portion 114 disposed on the fifth surface 5 side and a second margin portion 115 disposed on the sixth surface 6 side. The margin portions 114 and 115 may refer to a region between both ends of the internal electrodes 121 and 122 and the boundary surface of the body 110 in a cross-section of the body 110 in the first and third directions.

The margin portions 114 and 115 may be configured similarly to the dielectric layer 111 other than the configuration in which the internal electrodes 121 and 122 are not included. The margin portions 114 and 115 may basically prevent damage to the internal electrodes 121 and 122 due to physical or chemical stress.

The margin portions 114 and 115 may be formed by applying a conductive paste for an internal electrode and firing the ceramic green sheet other than a region in which the margin portion is formed. Alternatively, to suppress a step difference formed by the internal electrodes 121 and 122, after lamination, the internal electrodes 121 and 122 may be cut to be exposed to the fifth surface and sixth surface 5 and 6 of the body, and a single dielectric layer or two or more dielectric layers may be laminated on both surfaces facing each other in the third direction of the capacitance formation portion Ac, thereby forming the margin portions 114 and 115.

An average thickness tm of the margin portions 114 and 115 does not need to be limited to any particular example. That is, the average thickness tm of the margin portions 114 and 115 may be arbitrarily determined depending on desired properties or purposes. For example, for miniaturization and high capacity of multilayer electronic components, the average thickness tm of the margin portions 114 and 115 may be 100 μm or less, 20 μm or less, or 15 μm or less, but an embodiment thereof is not limited thereto. Here, the average thickness tm of the margin portions 114 and 115 may refer to an average thickness of each of the first margin portion 114 and the second margin portion 115.

The average thickness tm of the margin portions 114 and 115 may refer to an average size of the margin portions 114 and 115 in the third direction, and may be an average value of sizes in the third direction, measured at five points spaced apart from each other by an equal distance in cross-sections of the body 110 in the first and third directions.

The external electrodes 131 and 132 may be disposed on the body 110 and may be connected to the internal electrodes 121 and 122. The external electrodes 131 and 132 may be disposed on the third surface and fourth surface 3 and 4 of the body 110, and may extend to a portion of the first, second, fifth and sixth surfaces 1, 2, 5, and 6. The external electrodes 131 and 132 may include a first external electrode 131 connected to the first internal electrode 121 and the second external electrode 132 connected to the second internal electrode 122.

The external electrodes 131 and 132 may include first electrode layers **131*a* and 132*a* disposed on the third surface and fourth surface 3 and 4 of the body 110 and connected to the internal electrodes 121 and 122, and second electrode layers 132*a* and 132*b*** disposed on the first electrode layer.

The first electrode layers **131*a* and 132*a* may be formed by dipping the third surface and fourth surfaces 3 and 4 of the body 110 into a conductive paste for external electrodes including conductive metal and glass and firing. The conductive metal included in the first electrode layers 131*a* and 132*a*** may include Cu, Ni, Pd, Pt, Au, Ag, Pb, and/or alloys including the same, but an embodiment thereof is not limited thereto.

Meanwhile, the first electrode layers **131*a* and 132*a* may include only a layer including metal and glass, but an embodiment thereof is not limited thereto, and the first electrode layers 131*a* and 132*a* may have a multilayer structure. For example, the first electrode layers 131*a*** and

132*a* may include a first layer including metal and glass, and a second layer disposed on the first layer and including metal and resin.

A metal included in the second layer is not limited to any particular example and may include one or more selected from a group consisting of Ni, Cu, Pd, Ag, Au, Pt, Sn, W, Ti and alloys thereof. Resin included in the second layer may secure adhesion and may act as shock absorber. The resin is not limited to any particular example, and resin having bonding properties and shock absorption properties and mixed with metal powder to form a paste may be used. For example, the resin may include one or more types of resin selected from among epoxy resin, acrylic resin, ethyl cellulose, or the like.

The second electrode layers 131*b* and 132*b* may improve mounting properties. The type of the second electrode layers 131*b* and 132*b* is not limited to any particular example, and may be a plating layer including Ni, Sn, Pd, and/or an alloy including the same, and may be formed as a plurality of layers. The second electrode layers 131*b* and 132*b* may be, for example, a Ni plating layer or a Sn plating layer, or may be formed by sequentially forming a Ni plating layer and a Sn plating layer. Also, the second electrode layers 131*b* and 132*b* may include a plurality of Ni plating layer and/or a plurality of Sn plating layer.

In the drawing, the multilayer electronic component 100 may have two external electrodes 131 and 132, but an embodiment thereof is not limited thereto, and the number and the shape of the external electrodes 131 and 132 may change depending on the shape of the internal electrodes 121 and 122 or other purposes.

According to an embodiment, the cover portions 112 and 113 may include polydopamine. Polydopamine may be a polymer of dopamine. Polydopamine, formed by self-polymerization of dopamine, has covalent catechol and imine functional groups and may form strong bonds with both inorganic materials such as ceramic powder and organic materials such as binders.

As will be described later, dopamine hydrochloride illustrated in FIG. 5A may be added to the cover portion forming sheet for forming the cover portions 112 and 113 of the multilayer electronic component 100 according to an embodiment. Dopamine hydrochloride added to a sheet for forming the cover portion may form polydopamine polymer illustrated in FIG. 5B through polymerization. A sheet for forming the cover portion may form a strong bond with the ceramic powder or binder included in the sheet for forming the cover portion by including polydopamine polymer, and accordingly, adhesive strength of the sheet for forming the cover portion may be improved. Accordingly, when stacking ceramic green sheets for forming the cover portion to form the cover portions 112 and 113, delamination or cracks between sheets may be prevented, and heat and pressure applied during lamination and compression processes may be reduced.

The entirety or a portion of polydopamine polymer included in a sheet for forming the cover portion may be converted to nitrogen-doped carbonized polydopamine illustrated in FIG. 5C through a firing process for forming the body 110 of the multilayer electronic component 100. In an embodiment, at least a portion of polydopamine included in the cover portions 112 and 113 may be nitrogen-doped carbonized polydopamine. The nitrogen-doped carbonized polydopamine included in the cover portions 112 and 113 may be a two-dimensional material which may improve an elastic modulus and toughness of the cover portions 112 and 113, and accordingly, spread of cracks created in the cover portions 112 and 113 may be suppressed. Accordingly, mechanical strength of the multilayer electronic component 100 may be improved, and ultimately the moisture resistance reliability of the multilayer electronic component 100 may be improved.

In one embodiment, a content (at %) of nitrogen in a total content (at %) of elements included in the cover portions 112 and 113 may be greater than 0 at % and less than or equal to 3 at %. Among the elements (e.g., C, N, Ba, O, and Ti) included in cover portions 112 and 113, nitrogen may be derived from nitrogen-doped carbonized polydopamine. When a nitrogen content exceeds 3 at % in the total content (at %) of the elements included in the cover portions 112 and 113, a polydopamine content may be excessive, such that brittle fracture may occur due to the formation of agglomerates.

It may not be necessary to limit a method of measuring the nitrogen content (at %) in the total content of elements included in the cover portions 112 and 113. For example, the nitrogen content may be measured by obtaining an image by scanning a cross-section of the body 110 in the first and second directions using a transmission electron microscope (TEM) or scanning electron microscope (SEM), analyzing five points at equal intervals in the second direction in the cover portions 112 and 113 using energy dispersive spectroscopy (EDS), and obtaining an average value of the contents (at %) occupied by nitrogen in the total content of 100 at % of the elements included in the cover portions 112 and 113 at each point.

Hereinafter, the cover portion will be described in greater detail with reference to FIG. 6. FIG. 6 is an enlarged diagram illustrating a portion of the second cover portion 113 and, since the configurations of the first cover portion 112 and the second cover portion 113 are substantially the same, the description below may include the description of the first cover portion 112 and the second cover portion 113.

Referring to FIG. 6, the cover portion 113 may include a plurality of dielectric grains G1 and a grain boundary GB1 disposed between adjacent dielectric grains G1, and polydopamine included in the cover portion 113 may be disposed at the grain boundary GB1. Polydopamine disposed at the grain boundary GB1 may effectively block spread of cracks. Also, nitrogen-doped carbonized polydopamine may be hydrophobic, and as nitrogen-doped carbonized polydopamine is disposed at the grain boundary (GB1), nitrogen-doped carbonized polydopamine may act as a barrier against moisture penetration. The presence of polydopamine and/or nitrogen-doped carbonized polydopamine at the grain boundary GB1 may be indicated by the presence of N as determined by SEM-EDS. Other methods and/or tools appreciated by one of ordinary skill in the art, even if not described in the present disclosure, may also be used.

Referring to FIG. 8, when cracks CR spreads toward the grain boundary GB1 present between the dielectric grains G1, forces such as $\tau S$ ($\tau S=\mu NR$, where u: dynamic friction) may be consumed as energy. In this case, when polydopamine having a high elastic modulus is present in the grain boundary GB1, the $\mu$ value may increase. That is, when polydopamine having a high elastic modulus is present in the grain boundary GB1, more energy may be consumed for spread of cracks, spread of cracks may be effectively prevented.

Nitrogen-doped carbonized polydopamine disposed at the grain boundary GB1 may induce densification of the cover portion 113 by suppressing a grain growth of the dielectric grains G1. An average size of the plurality of dielectric grains G1 included in the cover portion 113 may be, for example, 170 nm or more and 200 nm or less.

As illustrated in FIG. 7, the dielectric layer 111 may include a plurality of dielectric grains G2 and a grain boundary GB2 disposed between adjacent dielectric grains G2. An average size of the plurality of dielectric grains G2 included in the dielectric layer 111 does not need to be limited to any particular example. An average size of the plurality of dielectric grains G2 included in the dielectric layer 111 may be larger than an average size of the plurality of dielectric grains G1 included in the cover portion 113. In this case, there may be an advantage in terms of improving capacitance of the multilayer electronic component 100. However, an embodiment thereof is not limited thereto, and an average size of the plurality of dielectric grains G2 included in the dielectric layer 111 may be smaller than an average size of the plurality of dielectric grains G1 included in the cover portion 113. In this case, there may be an advantage in terms of improving reliability of the multilayer electronic component 100.

The average size of the plurality of first dielectric crystal grains G1 included in the cover portion 113 may be, for example, an average value of grain sizes obtained by obtaining an image of a central region (for example, region K1 in FIG. 3) of the cover portion 113 magnified 50,000 times from cross-sections of the multilayer electronic component 100 in the first and second directions cut from a center in the third direction using a scanning electron microscope (SEM), and analyzing an image using an image analysis program, for example, Zootos Program from Zootos.

Also, the average size of the plurality of second dielectric grains G2 included in the dielectric layer 111 may be, for example, an average value of grain sizes, obtained by obtaining an image, magnified 50,000 times, of the dielectric layer 111 disposed in a central region (for example, region K2 in FIG. 4) of the capacitance formation portion Ac from cross-sections of multilayer electronic component 100 in the first and second direction cut from a center in the third direction using a scanning electron microscope (SEM), and analyzing an image using an image analysis program, for example, Zootos Program from Zootos.

Referring to FIG. 9, in an embodiment, when the cover portions 112 and 113 are analyzed using X-ray photoelectron spectroscopy (XPS), an N1s peak and a C1s peak may be detected. When the cover portions 112 and 113 include nitrogen-doped carbonized polydopamine, an N1s peak may be further detected in addition to Ba3d5, O1s, Ti2p, and C1s peaks. That is, when the N1s and C1s peaks are detected simultaneously during XPS analysis, it may be determined that nitrogen-doped carbonized polydopamine may be present in the cover portions 112 and 113. Meanwhile, intensity of the N1s peak may have a maximum value at a binding energy of 395 eV to 405 eV, and intensity of the C1s peak may have a maximum value at a binding energy of 280 eV or more and 290 eV or less, but an embodiment thereof is not limited thereto.

XPS analysis of the cover portions 112 and 113 may be performed on external surfaces of the cover portions 112 and 113, but an embodiment thereof is not limited thereto, and the analysis may also be performed on cross-sections in the first and second direction, polished up to a central portion of the multilayer electronic component 100 in the third direction.

Referring to FIG. 10, in an embodiment, during Raman analysis of the cover portions 112 and 113, the first peak X may be detected at a Raman shift of 1360 $cm^{-1}$ to 1380 $cm^{-1}$, and the second peak Y may be detected at a Raman shift of 1610 $cm^{-1}$ to 1630 $cm^{-1}$. The first peak (X) may refer to a D peak, and the second peak (Y) may refer to a G peak. During Raman analysis of the cover portions 112 and 113, the first peak X and the second peak Y may appear simultaneously because the cover portions 112 and 113 may have a carbonized polydopamine structure having a two-dimensional structure.

In an embodiment, a ratio of maximum intensity of the first peak X to maximum intensity of the second peak Y may be 0.01 or more and 1.50 or less. The ratio of maximum intensity of first peak X to maximum intensity of second peak Y may vary depending on defects in the carbonized polydopamine or the degree of nitrogen doping.

In an embodiment, a full width at half maximum of the first peak may be 80 $cm^{-1}$ or more 90 $cm^{-1}$ or less, and a full width at half maximum of the second peak Y may be 100 $cm^{-1}$ or more 110 $cm^{-1}$ or less. A full width at half maximum may refer to a width of the peak when intensity is full width at half maximum intensity of the peak. The full width at half maximum of the first peak (X) and the full width at full width at half maximum of the second peak (Y) may vary depending on the degree of defects or nitrogen doping in the carbonized polydopamine.

Raman analysis of the cover portions 112 and 113 may be performed on external surfaces of the cover portions 112 and 113, but an embodiment thereof is not limited thereto, and may also be performed on cross-sections in the first and second direction polished up to a central portion of the multilayer electronic component 100 in the third direction.

In an embodiment, the dielectric layer 111 may not include polydopamine. When the dielectric layer 111 includes polydopamine, mechanical strength of the dielectric layer 111 may be improved, but when polydopamine is included in the dielectric layer 111, which is directly related to electrical properties of the multilayer electronic component 100, side effects, such as deterioration of a breakdown voltage of the multilayer electronic component 100 may occur.

When the dielectric layer 111 does not include (is free of) polydopamine, nitrogen may not be detected in the dielectric layer 111. Also, when analyzing the dielectric layer 111 using X-ray photoelectron spectroscopy (XPS), the N1s peak may not be detected. Also, when performing Raman analysis on dielectric layer 111, a peak may not be detected in at least one of the Raman shift of 1360 $cm^{-1}$ to 1380 $cm^{-1}$ and the Raman shift of 1610 $cm^{-1}$ to 1630 $cm^{-1}$.

In an embodiment, the dielectric layer 111 may include a smaller content of polydopamine than the content of polydopamine included in the cover portions 112 and 113. When polydopamine is added to the dielectric layer 111 to improve mechanical strength of the dielectric layer 111, a smaller content of polydopamine than the content of polydopamine included in the cover portions 112 and 113 may be added to prevent electrical properties of the multilayer electronic component 100 from deteriorating. When the dielectric layer 111 includes polydopamine, the polydopamine may be disposed at the second grain boundary GB2 of the dielectric layer 111.

When the dielectric layer 111 includes polydopamine, during Raman analysis of the dielectric layer 111, the third peak may be detected at a Raman shift of 1360 $cm^{-1}$ to 1380 $cm^{-1}$, and a fourth peak may be detected at a Raman shift of 1610 $cm^{-1}$ to 1630 $cm^{-1}$. As the dielectric layer 111 includes less polydopamine than the content of polydopamine included in the cover portions 112 and 113, intensity of the third peak may be lower than intensity of the first peak X, and intensity of the fourth peak may be lower than intensity of the second peak Y, but an embodiment thereof is not limited thereto.

Experimental Example

<Manufacturing Samples>

Ceramic slurry was prepared by mixing $BaTiO_3$ powder, an organic solvent, such as ethanol, and a binder such as polyvinyl butyral, the ceramic slurry was applied to and dried on a carrier film, thereby preparing a ceramic green sheet. Thereafter, a conductive paste for internal electrode including Ni powder and binder was prepared at a predetermined thickness on the ceramic green sheet.

Thereafter, the ceramic green sheets for a cover portion on which the internal electrode pattern is not formed were laminated, tens to hundreds of layers of ceramic green sheets including internal electrode patterns were laminated, ceramic green sheets for the cover portion in which the internal electrode pattern was not formed were laminated, and pressing, cutting and firing processes were performed, thereby forming a body.

In this case, in the comparative example, dopamine hydrochloride was not added to ceramic slurry for forming a ceramic green sheet for the cover portion. In embodiment 1, 0.5 parts by weight of dopamine hydrochloride was added to 100 parts by weight of the total ceramic slurry to form a ceramic green sheet for the cover portion. In embodiment 2, 1 part by weight of dopamine hydrochloride was added to 100 parts by weight of the total ceramic slurry to form a ceramic green sheet for the cover portion.

Thereafter, the body was dipped in a conductive paste mixed with Cu powder, glass frit, binder and solvent and was fired, thereby forming a first electrode layer, and a Ni plating layer and Sn plating layer were formed in order on the first electrode layer, thereby forming a second electrode layer. Accordingly, sample chips for comparative example, embodiment 1 and embodiment 2 were prepared.

<Assessment of Hardness and Toughness>

Thereafter, hardness and toughness of the cover portion of each sample were assessed. Hardness and toughness of the cover portion were measured using a Vickers hardness meter on an external surface of the cover portion, and the assessment was performed on 20 sample chips in each of the comparative example, embodiment 1 and embodiment 2.

Figure 11:
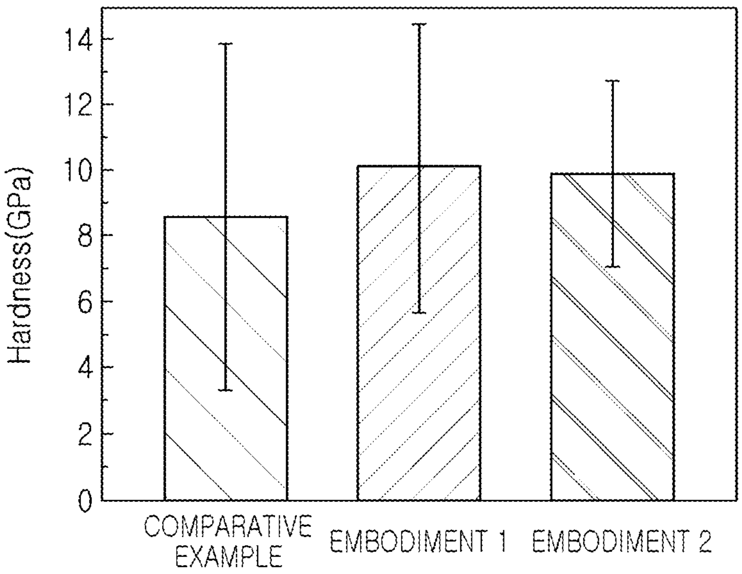
FIG. 11 is a graph indicating results of measuring hardness of comparative examples and examples.
Figure 12:
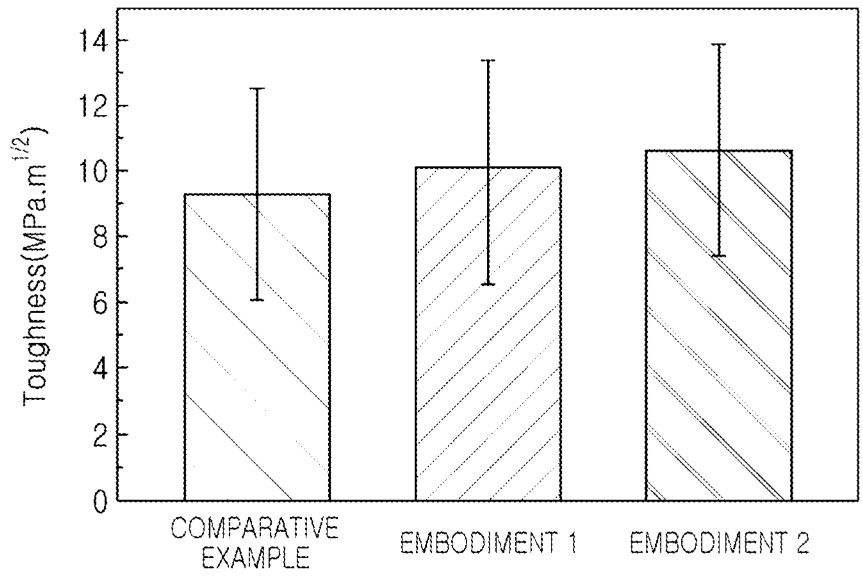
FIG. 12 is a graph indicating results of measuring toughness of comparative examples and examples.

FIG. 11 is a graph indicating results of measuring hardness of comparative examples and examples. FIG. 12 is a graph indicating results of measuring toughness of comparative examples and examples.

Referring to FIGS. 11 and 12, it may be confirmed that, in embodiment 1 and embodiment 2 hardness and toughness were more improved as compared to the comparative example. The assessment was also performed on a sample in which more than 1 part by weight of dopamine hydrochloride was added per 100 parts by weight of the ceramic slurry to form a ceramic green sheet for the cover portion, but hardness and toughness values were not measured due to brittle fracture of the sample chip, which was due to the effect of agglomerates caused by an excessive dopamine hydrochloride content.

<Assessment of Moisture Resistance Reliability>

Thereafter, assessment of moisture resistance reliability was conducted on a sample chip of the comparative example and a sample chip of f embodiment 2. Moisture resistance reliability was assessed by applying a temperature of 85° C., humidity of 85%, and a voltage of 3.75V for 8 hours to each of 400 sample chips in the comparative example and embodiment 2, and measuring changes in insulation resistance (IR).

Figure 13A:
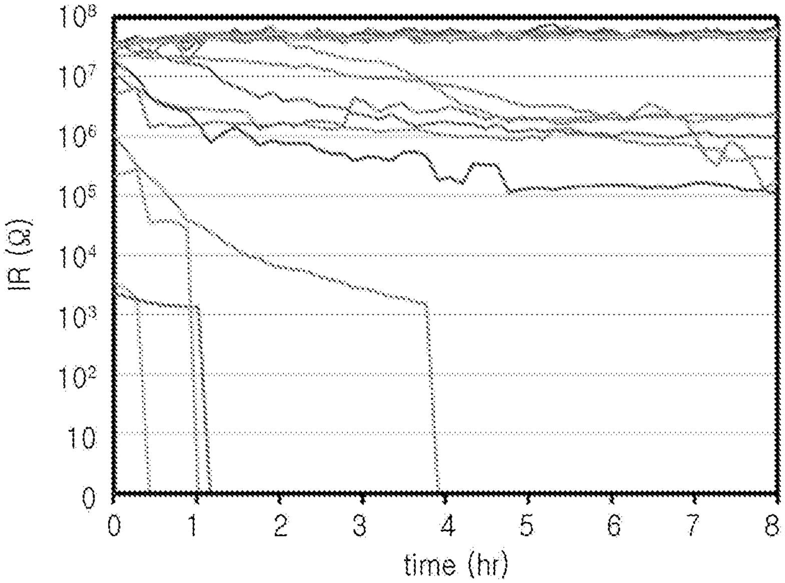
FIG. 13A is a graph indicating results of reliability assessment of comparative examples.
Figure 13B:
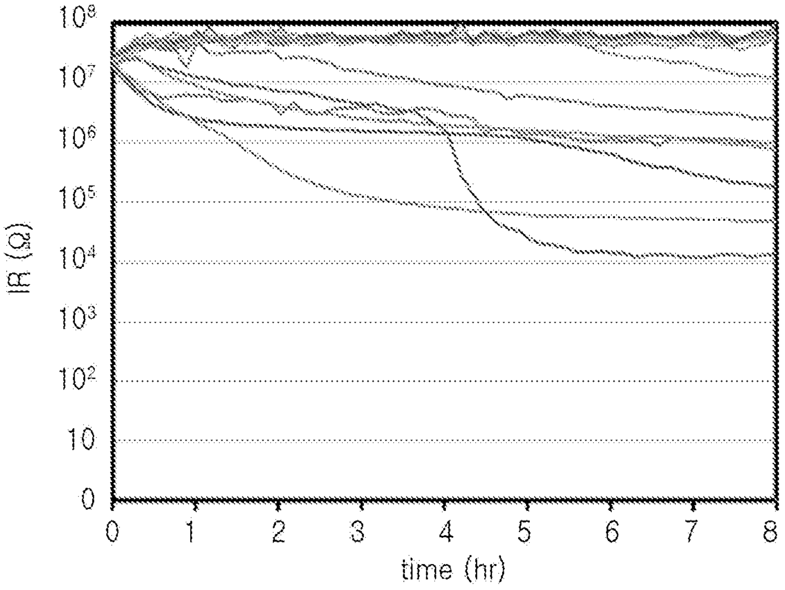
FIG. 13B is a graph indicating results of reliability assessment of embodiments of the present disclosure.

FIG. 13A is a graph indicating results of reliability assessment of comparative examples and FIG. 13B is a graph indicating results of reliability assessment of embodiment 2 (embodiments of the present disclosure). Referring to FIG. 13A and FIG. 13B, in the comparative example, it may be confirmed that a sample in which insulation resistance (IR) decreased rapidly initially as compared to embodiment 2. In other words, because nitrogen-doped carbonized polydopamine, which is hydrophobic, was located at grain boundaries and worked a barrier against moisture penetration, moisture resistance reliability was further improved in embodiment 2 as compared to comparative example 1.

According to the aforementioned embodiments, a multilayer electronic component having excellent mechanical strength and moisture resistance reliability may be provided.

The embodiments do not necessarily limit the scope of the embodiments to a specific embodiment form. Instead, modifications, equivalents and replacements included in the disclosed concept and technical scope of this description may be employed. Throughout the specification, similar reference numerals are used for similar elements.

In the embodiments, the term "embodiment" may not refer to one same embodiment, and may be provided to describe and emphasize different unique features of each embodiment. The above suggested embodiments may be implemented do not exclude the possibilities of combination with features of other embodiments. For example, even though the features described in an embodiment are not described in the other embodiment, the description may be understood as relevant to the other embodiment unless otherwise indicated.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

While the embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:

a body including a capacitance formation portion including a dielectric layer and internal electrodes alternately disposed in a first direction, and a cover portion disposed on both surfaces of the capacitance formation portion opposing each other in a first direction; and an external electrode disposed on the body and connected to the internal electrodes, wherein the cover portion includes polydopamine, and wherein at least a portion of the polydopamine included in the cover portion is nitrogen-doped carbonized polydopamine.

2. The multilayer electronic component of claim 1, wherein a nitrogen content (at %) of a total content (at %) of elements included in the cover portion is greater than 0 at % and less than or equal to 3 at %.

3. The multilayer electronic component of claim 1, wherein the cover portion includes a plurality of dielectric grains and grain boundaries disposed between adjacent dielectric grains, and wherein the polydopamine included in the cover portion is disposed at at least one of the grain boundaries.

4. The multilayer electronic component of claim 1, wherein the cover portion includes a plurality of dielectric grains and grain boundaries disposed between adjacent dielectric grains, and wherein an average size of the plurality of dielectric grains included in the cover portion is 170 nm or more and 200 nm or less.

5. The multilayer electronic component of claim 1, wherein, in the cover portion, a N1s peak and a C1s peak are detected when analyzed using X-ray photoelectron spectroscopy (XPS).

6. The multilayer electronic component of claim 1, wherein, during Raman analysis of the cover portion, a first peak is detected at a Raman shift of 1360 $cm^{-1}$ to 1380 $cm^{-1}$, and a second peak is detected at a Raman shift of 1610 $cm^{-1}$ to 1630 $cm^{-1}$.

7. The multilayer electronic component of claim 6, wherein a ratio of maximum intensity of the first peak to maximum intensity of the second peak is 0.01 or more and 1.50 or less.

8. The multilayer electronic component of claim 6, wherein a full width at half maximum of the first peak is 80 $cm^{-1}$ or more and 90 $cm^{-1}$ or less, and a full width at half maximum of the second peak is 100 $cm^{-1}$ or more and 110 $cm^{-1}$ or less.

9. The multilayer electronic component of claim 1, wherein the dielectric layer is free of the polydopamine.

10. The multilayer electronic component of claim 1, wherein the dielectric layer includes the polydopamine, a content of the polydopamine included in the dielectric layer is less than a content of the polydopamine included in the cover portion.

11. The multilayer electronic component of claim 1, wherein, during analysis using X-ray photoelectron spectroscopy (XPS), a NIs peak is detected in the cover portion, and the N1s peak is not detected in the dielectric layer.

12. The multilayer electronic component of claim 1, wherein, during Raman analysis, a first peak is detected at a Raman shift of 1360 $cm^{-1}$ to 1380 $cm^{-1}$ in the cover portion, a second peak is detected at a Raman shift of 1610 $cm^{-1}$ to 1630 $cm^{-1}$, and no peak is detected in at least one of a Raman shift of 1360 $cm^{-1}$ to 1380 $cm^{-1}$ and a Raman shift of 1610 $cm^{-1}$ to 1630 $cm^{-1}$ in the dielectric layer.

13. The multilayer electronic component of claim 1, wherein during Raman analysis, in the cover portion, a first peak is detected at a Raman shift of 1360 $cm^{-1}$ to 1380 $cm^{-1}$, a second peak is detected at a Raman shift of 1610 $cm^{-1}$ to 1630 $cm^{-1}$, and in the dielectric layer, a third peak is detected at a Raman shift of 1360 $cm^{-1}$ to 1380 $cm^{-1}$, and a fourth peak is detected at a Raman shift of 1610 $cm^{-1}$ to 1630 $cm^{-1}$, and wherein intensity of the third peak is lower than intensity of the first peak, and intensity of the fourth peak is lower than intensity of the second peak.

14. The multilayer electronic component of claim 1, wherein at least a portion of the polydopamine included in the cover portion is nitrogen-doped carbonized polydopamine, wherein a nitrogen content (at %) of a total content (at %) of elements included in the cover portion is greater than 0 at % and less than or equal to 3 at %, wherein the cover portion includes a plurality of dielectric grains and grain boundaries disposed between adjacent dielectric grains, and wherein an average size of the plurality of dielectric grains included in the cover portion is 170 nm or more and 200 nm or less.

15. The multilayer electronic component of claim 14, wherein the dielectric layer is free of the polydopamine.

16. The multilayer electronic component of claim 14, wherein the dielectric layer includes the polydopamine, and wherein a content of the polydopamine included in the dielectric layer is less than a content of the polydopamine included in the cover portion.

* * * * *